Figure 1:
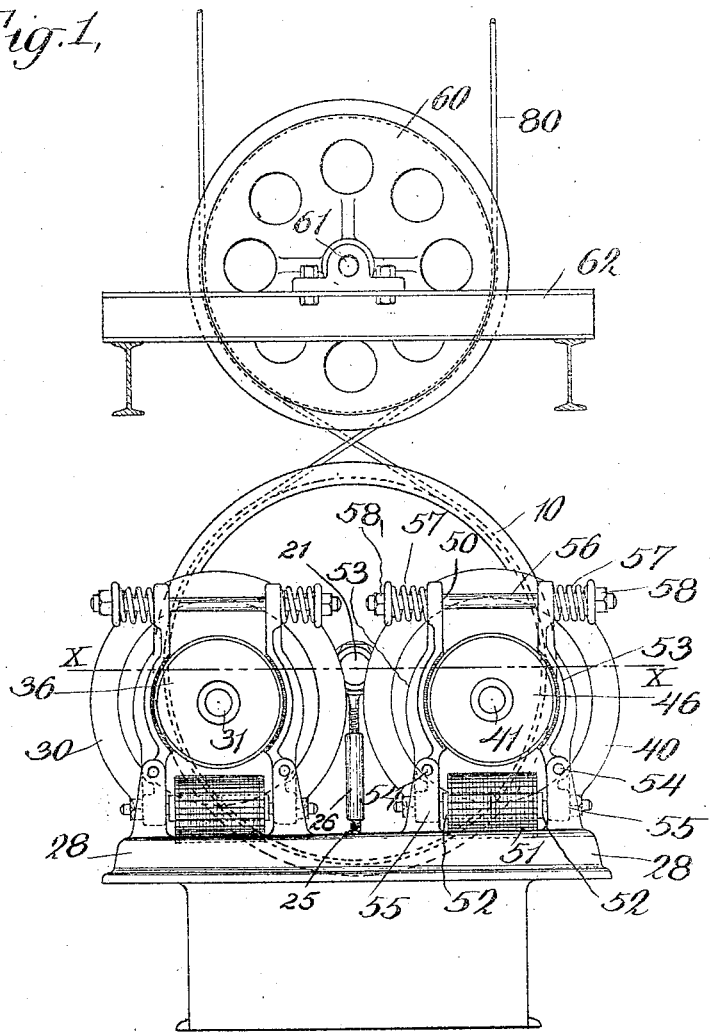

D. LARSON.
FRICTION DRIVE APPARATUS.
APPLICATION FILED NOV. 15, 1906. RENEWED OCT. 10, 1908.

921,646.

Patented May 11, 1909.
4 SHEETS—SHEET 1.

Witnesses:
Inventor
David Larson
By E. W. Marshall
Attorney

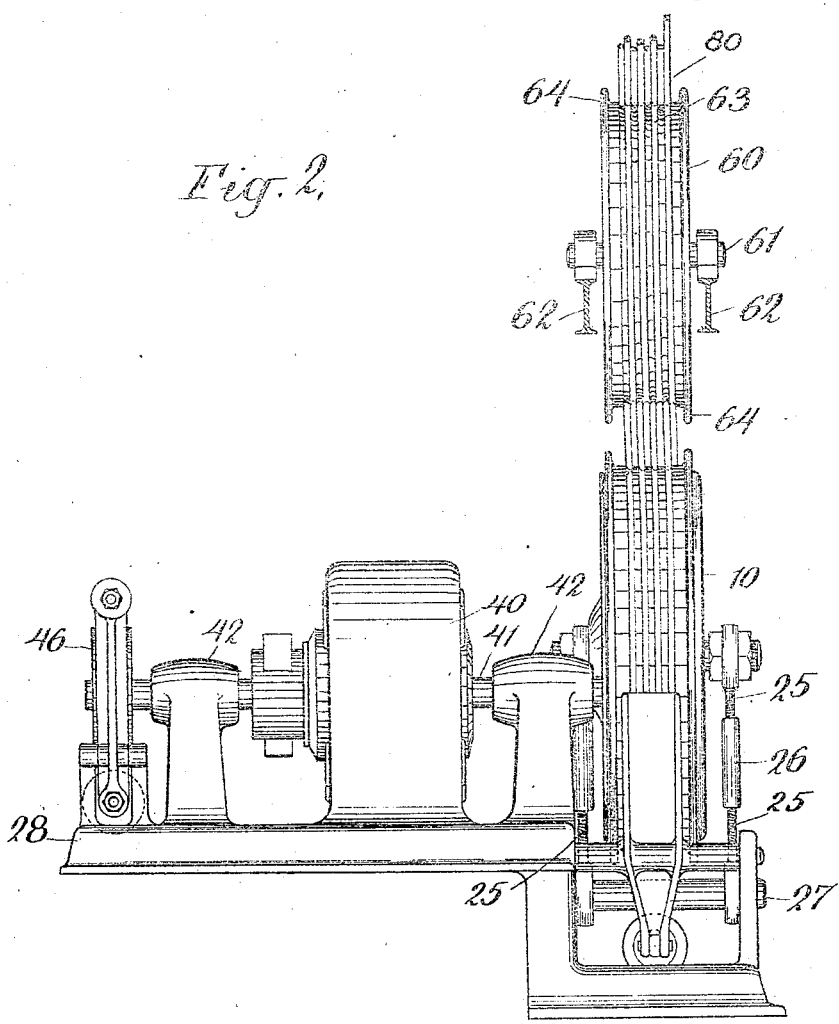

D. LARSON.
FRICTION DRIVE APPARATUS.
APPLICATION FILED NOV. 15, 1906. RENEWED OCT. 10, 1908.
921,646.
Patented May 11, 1909.
4 SHEETS—SHEET 3.
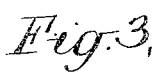
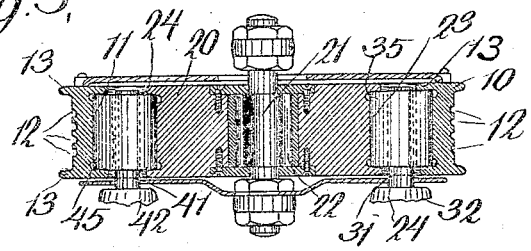
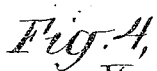
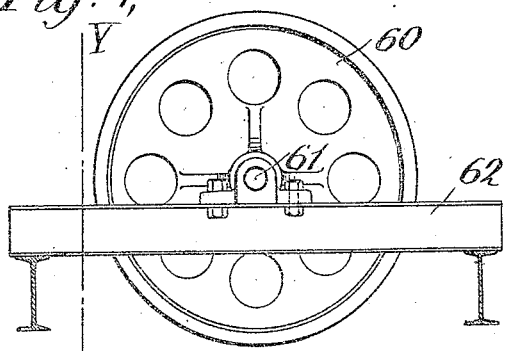
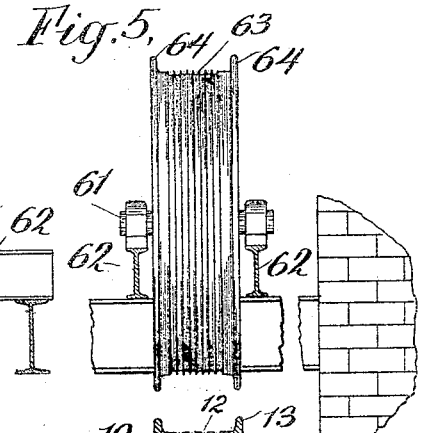
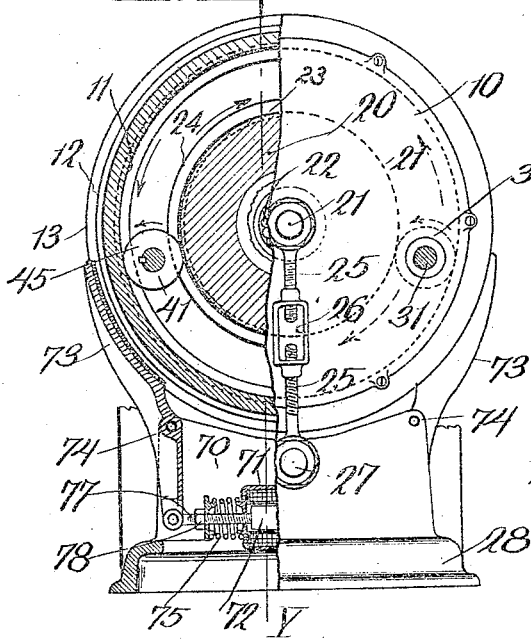
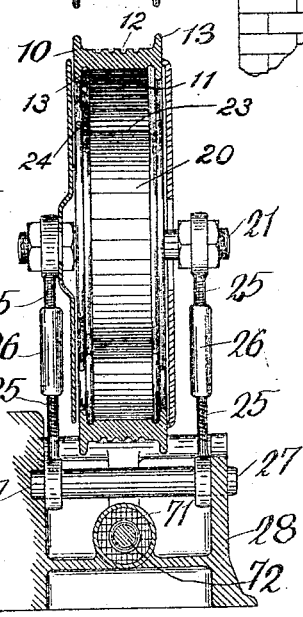
Witnesses:
Inventor
David Larson
By E. W. Marshall
Attorney

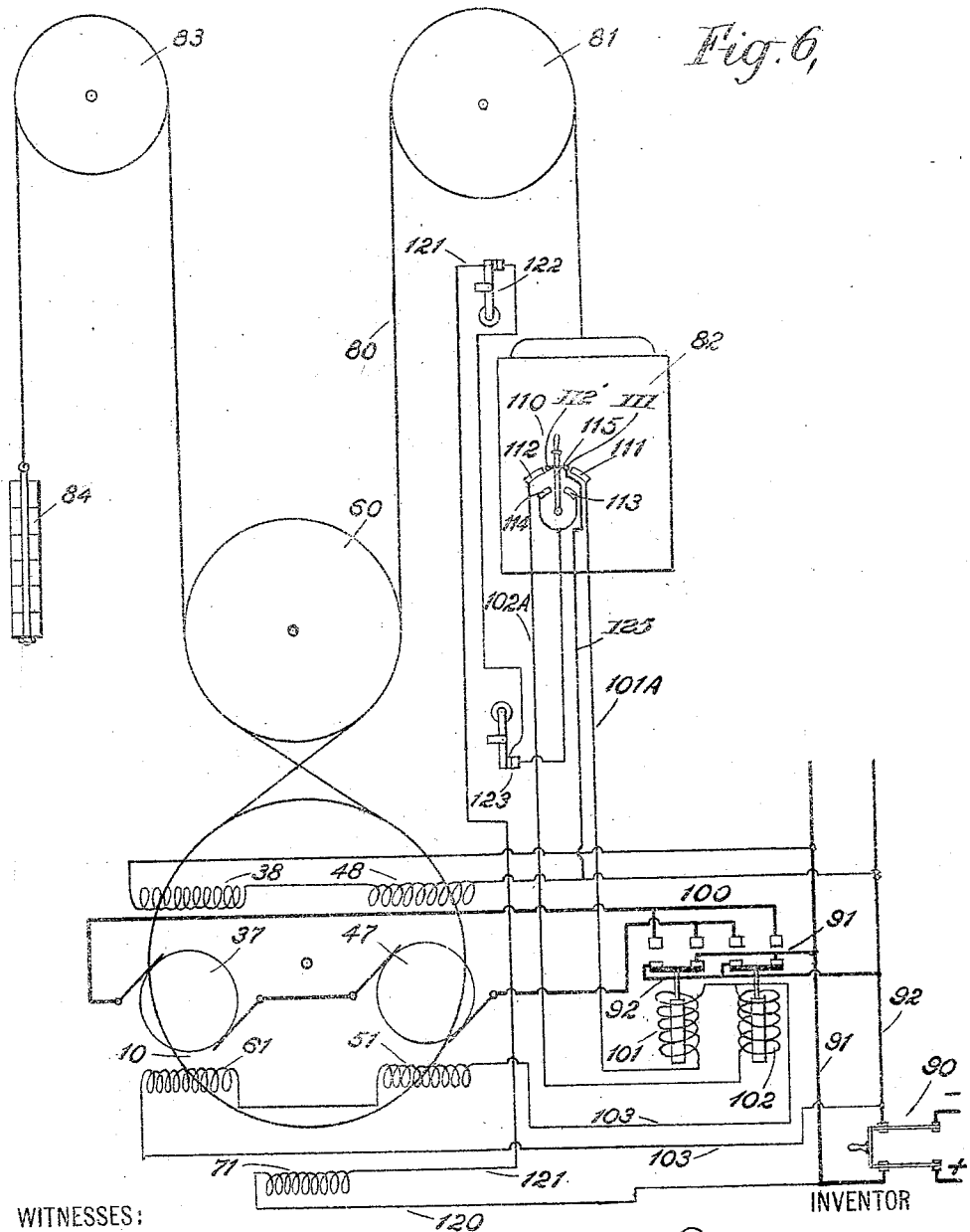

UNITED STATES PATENT OFFICE.

DAVID LARSON, OF YONKERS, NEW YORK.

FRICTION DRIVE APPARATUS.

No. 921,646.	Specification of Letters Patent.	Patented May 11, 1909.

Application filed November 15, 1906, Serial No. 343,647. Renewed October 10, 1908. Serial No. 457,173.

*To all whom it may concern:*

Be it known that I, DAVID LARSON, a subject of the King of Sweden, and a resident of Yonkers, in the county of Westchester and State of New York, United States of America, have invented certain new and useful Improvements in Friction Drive Apparatus, of which the following is a specification.

My invention relates to a friction drive apparatus and especially to a new and useful combination of parts whereby the rotary motion of a motor is transmitted to a rope at a greatly reduced speed. Its object is to provide a simple and inexpensive frictional transmission device which is efficient in its operation and which is practically noiseless.

I will describe my invention in the following specification and point out the novel features thereof in claims.

Referring to the drawings, Figure 1 is a front elevation of certain apparatus embodying my invention. Fig. 2 is a side elevation of the parts shown in Fig. 1. Fig. 3 is a sectional plan view of some of the parts shown in Fig. 1, the section being taken through the line X†–X in Fig. 1. Fig. 4 is a rear elevation, partly in section, of some of the parts shown in Fig. 2. Fig. 5 is a sectional side elevation of the parts shown in Fig. 4, the section being taken through the line Y—Y of Fig. 4. Fig. 6 is a diagrammatic representation of my invention applied to an electric elevator showing a simple form of electrical connections which may be used in carrying out my invention.

Like characters of reference designate corresponding parts in all of the figures.

10 designates an annular driving ring which is loosely mounted in the manner which will appear hereinafter. 11 designates the inner surface of this annular ring which is a flat friction surface. Its outer surface is provided with grooves 12 which are arranged to take a rope or cable. 13, 13 designate flanges of this driving ring which extend inwardly beyond the flat friction surface 11 and outwardly beyond the cable grooves 12.

20 designates a stationary pulley rigidly mounted within the driving ring and mounted upon the shaft 21. I prefer to make the bearing of this pulley upon the shaft 21 with antifriction rollers 22 as shown. 23 designates the outer surface of this pulley which is preferably made flat as shown, and 24, 24 designate flanges extending beyond this friction surface 23.

25, 25 designate anchor-bolts which are arranged to adjustably support the shaft 21. These anchor-bolts are provided with adjusting screws 26, 26. The upper ends of these anchor-bolts are connected to the shaft 21 and the lower ends are connected to a shaft 27 which is attached to a base 28.

30 and 40 are reversible motors of any desired type. I have shown them in the drawings as electric motors as that type of motor is particularly adaptable for use in conjunction with my invention. 31 and 41 designate the shafts of these motors which are mounted upon stationary bearings 42 which are rigidly attached to the base 28.

35 and 45 designate two friction rollers which are rigidly attached to the shafts 31 and 41 and which are placed between the inner surface 11 of the annular driving ring 10 and the outer surface 23 of the pulley 20, and between the flanges 13, 13 of the annular driving ring and the flanges 24, 24 of the fixed pulley 20. The other ends of the shafts 31 and 41 may be provided with brake-pulleys 36 and 46 which are arranged to coact with braking-devices one of which I will now describe.

50 designates the braking device which is used in conjunction with the brake-pulley 46. A similar device is arranged to act in conjunction with the brake-pulley 36 but as these two mechanisms are similar in construction I will describe but one of them specifically. This brake mechanism comprises a solenoid 51 which is arranged to act upon a pair of cores of magnetic material 52, 52. 53, 53 designate brake-shoe levers which are pivotally mounted at 54, 54 on standards 55, 55 which are mounted upon the base 28. The other ends of these brake-shoe levers are connected together by a rod 56. Springs 57, 57 are used in conjunction with this rod 56 to press the brake-shoe levers together under a pressure which may be regulated by means of adjustable nuts 58, 58. Before proceeding with the detail description of the other parts of my apparatus I will briefly point out the operation of this brake 50. It may be seen that when the machine is at rest the springs 57, 57 apply the brake-shoe levers to the brake pulley and cause these brake-shoe levers to hold the brake pulley 46 and consequently the shaft 41 and its connected parts. When a current of electricity is passed through the solenoid 51 the latter is arranged to draw its magnetic cores inward and to thereby release the brake-shoe levers against the action of the springs 57, 57. 60 designates a stationary idler-pulley which is preferably mounted directly above the annular driving ring upon a shaft 61 which is mounted upon bearings securely attached to I-beams 62, 62 which may be a part of the structure in which the apparatus is used. The outer periphery of this idler-sheave is preferably provided with rope or cable grooves 63 and flanges 64, 64 as shown. 70 designates another braking apparatus which is also mounted upon the base 28. In this braking apparatus, 71 designates a solenoid; 72 one of its magnetic cores; 73, 73 designate brake-shoe levers which are mounted upon the base 28 at 74, 74. 75 designates one of a pair of springs which springs are arranged to act upon the brake-shoe levers 73, 73 and to apply them to ropes or cables which pass around the outer periphery of the driving ring 10 in a manner which will be presently described. The pressure with which the brake-shoes are applied may be regulated by means of an adjusting-nut 78 upon a threaded bolt 77. The general operation of the braking apparatus 70 is similar to that previously described in conjunction with the brake 50. 80 designates cable or cables which, as shown in Figs. 1, 2 and 6, are led down past one side of the idler-sheave 60; thence around and under the loose annular driving ring 10. In this manner each of the cables surrounds a large part of the periphery of the driving ring 10. One end of this cable or each of these cables may be passed over a supporting sheave 81 and thence down to an elevator car 82 to which it is attached. The other end of these cables may be run up and over a supporting sheave 83 and thence down to a counterweight 84 to which it is attached.

In Fig. 6 + and − designate mains from a suitable source of electric supply which, after passing through a main-switch 90, extend through main-line conductors 91 and 92 and other wires to various pieces of apparatus in the manner which I will now briefly point out. 37 and 47 designate the armatures of the motors 30 and 40, and 38 and 48 designate their shunt field windings. These field windings are connected together in series and are connected to the mains 91 and 92. 100 is an electrically actuated reversing switch which comprises two solenoids 101 and 102. The upper terminal of each of these solenoids is connected by a conductor 103 through the brake solenoids 51 and 61' to the main 92. The other terminal of solenoid 101 is connected by conductor 101$^A$ to stationary contact 111 in a manually operated car-switch 110, and the other terminal of solenoid 102 is connected by the conductor 102$^A$ to stationary contact 112 in the car-switch. The reversing switch 100 further comprises certain movable contacts to which the motor armature terminals are connected. The emergency or safety brake solenoid 71 has one of its terminals connected to the main-line 91 by a conductor 120. Its other terminal is connected by a conductor 121 to stationary contacts 113 and 114 in the car-switch 110 after passing through two automatic limit-stop switches 122 and 123. These limit switches are arranged to be opened by the car 82 striking against them when it reaches the limits of its travel. When the car reaches the upper limit of its travel it will strike against a portion of limit-switch 122 and cause it to open the circuit; when the car reaches the lower limit of its travel it will strike against portion of limit-switch 123 and cause the latter to open the circuit.

As I have briefly pointed out the circuits, I will now briefly describe their operation. In the car-switch 110 is a pivoted contact lever 115 which may be moved from its central position to the left or right at the will of an operator in a car. Let us, for example, consider that the operator moves this contact lever to the right to engage the contacts 111 and 113. He will thereby close a circuit from the positive main, through conductor 120, emergency or safety brake solenoid 71, conductor 121, limit stop-switches 122 and 123, contact 113,—which is now connected to contact 111—; thence, through conductor 101$^A$, reversing switch solenoid 101, conductor 103, brake solenoids 51 and 61' to the main-line conductor 92 which is connected to the − main. The circuit thus completed will energize the three brake magnets and the reversing switch solenoid 101. This solenoid, when energized, will cause the two left-hand movable contacts to be moved up against the stationary contacts directly above them and will thereby close a circuit from the positive main to the right-hand terminal of motor armature 47; through the armatures 47 and 37 to the left-hand terminal of motor armature 37 which is now connected to the negative main through main-line conductor 92. As the shunt field windings of both motors are permanently connected across the mains and as the armatures are now also connected across the mains, the motors will be energized and will cause the friction rollers 35 and 45 to be rotated. These friction rollers are in contact with the inner surface of the loose annular ring 10 and with the outer surface of the stationary pulley 20. The frictional contact between these parts is maintained by the upward pull of the ropes or cables 80. The rotation of the motors will therefore be transmitted to the loose annular driving ring 10 and to the car 82 and counterweight 84 through the cables 80. The car will therefore be driven by the motors in one direction.

When it is desired to stop the motion of the car the operator may bring the contact lever 115 back toward its central position. The first effect of this operation will be to cause the conductor 115 to be moved off from the stationary contact 111 onto the contact 111', but it will remain in contact with the stationary contact 113. The circuit, through the reversing switch solenoid 101 and through the brake solenoids 51 and 61', will thereby be broken; the current will be cut off from the motor armatures and the shaft brakes will be applied. The circuit for the emergency brake solenoid 71 is now from the positive main through wire 120, solenoid 71, wire 121, limit stops 122, 123, lever 115, contact 111', and wire 125 to the negative main. A further movement of the car-switch lever 115 to its central position will cause it to be moved off from the stationary contacts 111' and 113 and the current, through the emergency brake solenoid 71, will thereby be cut off and the brake-shoe levers 73, 73 will be applied to the cables 80. Whenever either of the automatic limit-stops 122 or 123 is opened a circuit through the motor armatures and all of the brake solenoids will be interrupted and the apparatus thereby brought to rest. When it is desired to have the car driven in the opposite direction the car-switch lever 115 may be moved to the left and the operation will be similar to that already described, except that in this case solenoid 102 of the reversing switch will be energized and will cause the two right-hand movable contacts to be moved upward in such a manner that the motor armatures 37 and 47 will be connected to the main-lines in the opposite direction.

I have called the brake 71 an "emergency" or safety brake because in the usual operation of the elevator the brakes on the motor shafts may be used to bring the apparatus to rest. The braking effect of the emergency brake is powerful because it acts directly on the driving cables and has a tendency not only to hold the cables from further movement but to hold them tightly against the driving ring 10 and to prevent any slipping between the ropes and the driving ring.

It is possible to construct this system with but one motor, as for example, the motor 30, in which case the friction roller 45 may be mounted upon an independent shaft and may therefore be merely an idler-pulley. I prefer, however, to use two motors, except for very light duties, as the operation is smoother. When two motors are used the wiring system may be arranged to control them on the series-parallel system. Moreover, when two motors are used, the apparatus is more reliable because it can still be used after one of the motors is broken down and the elevator or other driven apparatus may be continued in use pending repairs.

I have shown this invention, as applied to direct currents but it is clearly applicable for use in conjunction with alternating currents. The wiring system which I have illustrated is an arbitrary arrangement and used to illustrate but one of many systems which may be used. When two motors are used it is possible to use the generated current of one of them in stopping and both of them in starting the apparatus, and many other variations can be made by anyone familiar with the art. I have but illustrated it as applied to an elevator system as this is one of its advantageous uses, but it may, of course, be put to many other uses. By its use a large speed reduction may be obtained which is simple and efficient and which runs with almost no noise.

What I claim is.—

1. A loose annular ring, a stationary pulley within said ring, two friction pulleys between the ring and the stationary pulley, and means for driving the friction pulleys.

2. A loose annular ring, a stationary pulley within said ring, two friction pulleys between the ring and the stationary pulley, with their axes below the axis of the fixed pulley, and means for driving the friction pulleys.

3. A loose annular ring, a stationary pulley within said ring, two friction pulleys in frictional contact with the inner surface of the ring and the outer surface of the stationary pulley, stationary bearings for the friction pulleys, and means for driving the friction pulleys.

4. A base, a loose annular ring, a stationary pulley within said ring adjustably mounted upon the base, two friction pulleys in frictional contact with the inner surface of the ring and the outer surface of the stationary pulley, stationary bearings for the friction pulleys, said stationary bearings being connected to the base, and means for driving the friction pulleys.

5. A base, a loose annular ring, a pulley within said ring, bearings for the pulley, said bearings being mounted upon the base, means for adjusting the position of said bearings relative to the base, two friction pulleys in frictional contact with the inner surface of the ring and the outer surface of the first-named pulley, stationary bearings for the friction pulleys, said stationary bearings being connected to the base, and means for driving the friction pulleys.

6. A base, a loose annular ring, a pulley within said ring, roller-bearings for the pulley, said bearings being adjustably mounted upon the base, two friction pulleys in frictional contact with the inner surface of the ring and the outer surface of the first-named pulley, stationary bearings for the friction pulleys, said bearings being connected to the base, and means for driving the friction pulleys.

7. A base, a loose annular ring, a stationary pulley within said ring, roller-bearings for the pulley, said bearings being adjustably mounted upon the base, two friction pulleys in frictional contact with the inner surface of the ring and the outer surface of the stationary pulley, with their axes below the axis of the stationary pulley, stationary bearings for the friction pulleys, said bearings being connected to the base, and means for driving the friction pulleys.

8. A hoisting cable, a loose annular driving ring receiving the cable, a stationary pulley within said ring, two friction pulleys between the ring and the stationary pulley, and means for driving the friction pulleys.

9. A hoisting cable, a loose annular driving ring receiving the cable, a stationary pulley within the ring, two friction pulleys in frictional contact with the inner surface of the ring and the outer surface of the stationary pulley, stationary bearings for the friction pulleys, and means for driving the friction pulleys.

10. A loose annular ring, a pulley within said ring, two friction pulleys between the ring and the first-named pulley, a shaft for each of said friction pulleys, and a motor for each of said shafts.

11. A hoisting cable, a loose annular driving ring receiving the cable, a pulley within said ring, two friction pulleys in frictional contact with the inner surface of the ring and the outer surface of said pulley, a shaft for each of said friction pulleys, stationary bearings for said shafts, and two motors, one of which is connected to one of the friction pulley shafts and the other of which is connected to the other of the friction pulley shafts.

12. A hoisting cable, a loose annular driving ring receiving the cable, a stationary pulley within the ring, two friction pulleys in frictional contact with the inner surface of the ring and the outer surface of the pulley, a shaft for each of said friction pulleys, stationary bearings for said shafts, and two motors, one of which is connected to one of the friction pulley shafts and the other of which is connected to the other of the friction pulley shafts, with their axes below the axis of the stationary pulley.

13. A loose annular ring, a pulley within said ring, two friction pulleys between the ring and the first-named pulley, means for driving one of the friction pulleys, and a brake arranged to act upon the loose ring.

14. A hoisting cable, a loose annular driving ring receiving the cable, a pulley within said ring, two friction pulleys between the ring and the first-named pulley, means for driving the friction pulleys, and a brake arranged to engage said cable and to hold the driving ring.

15. A hoisting cable, a loose annular driving ring receiving the cable, a pulley within said ring, two friction pulleys in frictional contact with the inner surface of the ring and the outer surface of the pulley, a shaft for each of said friction pulleys, stationary bearings for said shafts, two motors, one of which is connected to one of the friction pulley shafts and the other of which is connected to the other of the friction pulley shafts, and a brake arranged to engage said cable and to hold the driving ring.

16. A hoisting cable, a loose annular driving ring receiving the cable, a pulley within said ring, two friction pulleys in frictional contact with the inner surface of the ring and the outer surface of said pulley, a shaft for each of said friction pulleys, stationary bearings for said shafts, two motors, one of which is connected to one of the friction pulley shafts and the other of which is connected to the other of the friction pulley shafts, a brake for each of said friction pulley shafts, and a brake arranged to engage with the cable and to hold the driving ring.

17. A hoisting cable, a loose annular driving ring receiving the cable, a pulley within said ring, two friction pulleys in frictional contact with the inner surface of the ring and the outer surface of said pulley, a shaft for each of said friction pulleys, stationary bearings for said shafts, two electric motors, one of which is connected to one of the friction pulley shafts and the other of which is connected to the other of the friction pulley shafts, an electric brake for each of said pulley shafts, and an electric brake arranged to engage with the cable and to hold the driving ring.

18. A hoisting cable, a loose annular driving ring receiving the cable, a stationary pulley within said ring, two friction pulleys in frictional contact with the inner surface of the ring and the outer surface of the stationary pulley, a shaft for each of said friction pulleys, stationary bearings for said shafts, two electric motors, one of which is connected to one of the friction pulley shafts and the other of which is connected to the other of the friction pulley shafts, an electric brake for each of said pulley shafts, an electric brake arranged to engage with the cable and to hold the driving ring, and a wiring system for said motors and brakes.

19. A hoisting cable, a loose annular driving ring receiving the cable, a stationary idler-pulley for guiding said cable, a pulley within the driving ring, two friction pulleys between the ring and the said pulley, and means for driving the friction pulleys.

20. A hoisting cable, a base, a loose annular driving ring receiving the cable, an idler-pulley for guiding said cable, a bearing for the idler-pulley in a position permanently fixed relative to the base, a stationary pulley within the ring, bearings for the stationary pulley, means for adjusting said bearings relative to the base, two friction pulleys in frictional contact with the inner surface of the loose ring and the outer surface of the stationary pulley, bearings mounted upon the base for said friction pulleys, and means for driving the friction pulleys.

21. A hoisting cable, a movable member connected therewith, a loose annular driving ring receiving the cable, a stationary pulley within said ring, two friction pulleys between the ring and the stationary pulley, and means for driving the friction pulleys.

22. A hoisting cable, a movable member connected therewith, a loose annular driving ring, receiving the cable, a pulley within the ring, two friction pulleys in frictional contact with the inner surface of the ring and the outer surface of said pulley, a shaft for each of said friction pulleys, stationary bearings for said shafts, and two motors, one of which is connected to one of the friction pulley shafts and the other of which is connected to the other of the friction pulley shafts.

23. A hoisting cable, a movable member connected therewith, a loose annular driving ring receiving the cable, a stationary pulley within said ring, two friction pulleys in frictional contact with the inner surface of the ring and the outer surface of the stationary pulley, a shaft for each of said friction pulleys, stationary bearings for said shafts, two motors, one of which is connected to one of the friction pulley shafts and the other of which is connected to the other of the friction pulley shafts, a brake for each of said friction pulley shafts, and a brake arranged to engage with the cable and to hold the driving ring.

24. A hoisting cable, a movable member connected therewith, a base, a loose annular driving ring receiving the cable, an idler-pulley for guiding said cable, a bearing for the idler-pulley in a position permanently fixed relative to the base, a stationary pulley within the ring, bearings for the stationary pulley, means for adjusting said bearings relative to the base, two friction pulleys in frictional contact with the inner surface of the loose ring and the outer surface of the fixed pulley, bearings mounted upon the base for said friction pulleys, and means for driving the friction pulleys.

25. The combination with a base, of a pulley mounted above the base and carried thereby, means for adjusting the pulley toward and away from the base, an annular ring surrounding the pulley, and a drive pulley between the ring and the first-named pulley.

26. The combination with a base, of a shaft mounted therein, anchor bolts carried by the shaft, a bearing shaft carried by the anchor bolts, a pulley mounted on the bearing shaft, an annular ring surrounding the pulley, and friction drive pulleys between the ring and the first-named pulley.

27. The combination with a loose annular driving ring, of a stationary pulley within the ring, two friction pulleys between the ring and the stationary pulley, means for driving the friction pulleys, and a brake applied to press the ring against the friction pulleys.

28. The combination with a base, of a stationary pulley mounted thereon, a loose annular ring surrounding the pulley, two friction drive pulleys in contact with the inner surface of the ring and the outer surface of the first-named pulley and located below the center of the ring, means for driving said friction pulleys, and a brake located below the ring applied to bear upwardly thereon.

In testimony whereof I have signed my name to this specificaiton in the presence of two subscribing witnesses.

DAVID LARSON.

Witnesses:
ERNEST W. MARSHALL,
EDW. LUCE.